United States Patent
Andar et al.

(10) Patent No.: US 12,339,837 B2
(45) Date of Patent: Jun. 24, 2025

(54) CONCEPT MAPPING FOR CHAT AGENT COMPLAINT PROCESSING

(71) Applicant: Bank of America Corporation, Charlotte, NC (US)

(72) Inventors: Ravisha Andar, Plano, TX (US); Mohammed Zubair Mohammed Ajmal, Tamilnadu (IN); Pravin Kumar Sankari Bhagavathiappan, Kanyakumari District (IN); Chandra Chudeswaran Sankar, Huntersville, NC (US); Smruti Soumya Mishra, Concord, NC (US); Rohit Anant Bansod, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 182 days.

(21) Appl. No.: 18/369,301

(22) Filed: Sep. 18, 2023

(65) Prior Publication Data
US 2025/0094416 A1 Mar. 20, 2025

(51) Int. Cl.
| G06F 16/24 | (2019.01) |
| G06F 16/242 | (2019.01) |
| G06F 16/248 | (2019.01) |
| G06F 16/93 | (2019.01) |
| G06F 21/62 | (2013.01) |

(52) U.S. Cl.
CPC .......... *G06F 16/243* (2019.01); *G06F 16/248* (2019.01); *G06F 16/93* (2019.01); *G06F 21/6227* (2013.01)

(58) Field of Classification Search
None
See application file for complete search history.

(56) References Cited

U.S. PATENT DOCUMENTS

| 2018/0101527 A1* | 4/2018 | Govindarajan | ......... G06F 16/93 |
| 2020/0073995 A1* | 3/2020 | Martin | .................. G16H 70/40 |

* cited by examiner

Primary Examiner — Cai Y Chen
(74) Attorney, Agent, or Firm — Weiss & Arons LLP

(57) ABSTRACT

Methods for autocomplete-enabled complaint processing are provided. Methods may receive documents and extract terms from the documents. The documents may relate to previously stored complaints. Methods may map the terms to concepts. Methods may index the documents and mapped concepts within a search platform. Methods may receive and verify a request. Upon verification, methods may extract concepts from the request. Upon concept extraction, methods may generate a query. The query may include the one or more extracted concepts and/or any other suitable data from the request. The query may be transmitted to the search platform. The search platform may identify documents that match the request. The matched documents may be transmitted to a response generator. The response generator may utilize the extracted concepts and the identified documents to generate a response to the query. The response may be transmitted to the requestor.

20 Claims, 6 Drawing Sheets

URL:
https://ich-nlu-dev4.ecnp.financialinstitution.com/Natural
Language Processing Engine/rest/getTopicSuggestions?
appVersion=0&query=transfer&channel=CCA
                          └─ 204 ─┘

Enterprise search platform document

{
  "id": "CQC-000876-CQC-0008768::N/A",
  "contentId": "CQC-000876",
  "description": "account closing issue - client
  dissatisfied with process",
  "title_copy_synonyms":["account closing issue -
  client dissatisfied with process"],
  "answer": "CQC-000876::N/A",
  "minVersion": "0",
  "channel":"CCA",
  "search_partial":"account closing issue - client
  dissatisfied with process",
  "search_normalized":"CCCCAccount CCCCClosing
  CCCCTroubleshoot - client dissatisfied with process",
  "_version_":12345687967431234546}

⎣─────── 202 ───────⎦

Response:
[
  {
    "description": "ivr funds transfer",
    "contentId": "CQC-00456",
    "response": "CQC-000456:: Account not Eligible;;
    CQC-000537::Client not Eligible;;
    CQC-000538::Incorrect Amount Processed;;
    CQC-000539::Requested Amount Not Accepted;;
    CQC-000540::Unable To Complete",
    "template": "CQC-00456"
  },
  {
    "description": "warm transfer issue",
    "contentId": "CQC-00789",
    "response": "CQC-000789::N/A",
    "template": "CQC-00789"
  },
  {
    "description": "call transfer issue - multiple contacts/
    transfers",
    "contentId": "CQC-00754",
    "response": "CQC-000754::N/A",
    "template": "CQC-00754"
  },

```
},
{
    "description": "atm cash deposit unavailable",
    "contentId": "ATM Cash Deposit Unavailable",
    "response": "CQC-000526::n/a",
    "template": "ATM cash deposit unavailable"
},
{
    "description": "atm check deposit unavailable",
    "contentId": "ATM Check Deposit Unavailable",
    "response": "CQC-000528::n/a",
    "template": "ATM Check Deposit Unavailable"
},
{
    "description": "atm cleanliness financial center fc",
    "contentId": "ATM Cleanliness",
    "response": "CQC-000677::n/a",
    "template": "ATM Cleanliness"
},
```

FIG. 3A

```
},
{
    "description": "deposit wrong amount made at atm by mail in financial center on mobile banking via wire",
    "contentId": "Deposit Wrong Amount",
    "response": "CQC-000113::Made at ATM;;
        CQC-000114::Made By Mail;;
        CQC-000116::Made in Financial Center;;
        CQC-000121::Made On Mobile Banking;;
        CQC-000122::Made Via Wire;;",
    "template": "Deposit Wrong Amount"
}
```

FIG. 3B

```
[,
  {
    "description": "atm captured card",
    "contentId": "ATM Captured Card",
    "response": "CQC-000485::n/a",
    "template": "ATM Captured Card"
  },
  {
    "description": "atm withdrawal unavailable",
    "contentId": "ATM Withdrawal Unavailable",
    "response": "CQC-000476::n/a",
    "template": "ATM Withdrawal Unavailable"
  }
  {
    "description": "atm cash deposit unavailable",
    "contentId": "ATM Cash Deposit Unavailable",
    "response": "CQC-000452::n/a",
    "template": "ATM cash deposit unavailable"
  },
  {
    "description": "atm check deposit unavailable",
    "contentId": "ATM Check Deposit Unavailable",
    "response": "CQC-000443::n/a",
    "template": "ATM Check Deposit Unavailable"
  },
```

FIG. 3C

CONCEPT MAPPING FOR CHAT AGENT COMPLAINT PROCESSING

FIELD OF TECHNOLOGY

Aspects of the disclosure relate to complaint processing.

BACKGROUND OF THE DISCLOSURE

Currently, when a customer calls into a call center, a customer service agent may retrieve, and respond to, the call. The customer service agent may listen to the customer and communicate with the customer. The customer service agent may decide, based on the information provided by the customer during the call, that the call included a complaint. The agent may or may not decide to record the complaint within a complaint recordation system. Currently, there is typically no option for the customer to register a complaint within the complaint recordation system.

Additionally, in the event that the customer service agent records a complaint within the complaint recordation system, the complaint may be filed incorrectly. For example, the complaint recordation system may include a complaint category entry field. The customer service agent may be unaware, because of the agent's lack of familiarity with the subject matter of the complaint, of a complaint category to enter into the complaint category entry field. Furthermore, the complexity associated with the complaint recordation system may serve to reduce the complaints recorded by the customer service agent. Reducing the number of complaints provided by the customer service agent may reduce customer service in general because customers with complaints may not have their complaints responded to appropriately.

As such, it would be desirable to provide an autocomplete-enabled, two-way complaint recordation system. Such an autocomplete-enabled, two-way complaint recordation system may autocomplete complaint entries provided by customer service agents. Such an autocomplete-enabled, two-way complaint recordation system may decrease the time and effort expended by customer service agents to record and respond to complaints. Such an autocomplete-enabled, two-way complaint recordation system may be accessible by customers as well as customer service agents.

SUMMARY OF THE DISCLOSURE

An autocomplete-enabled, two-way complaint recordation system is provided. The autocomplete-enabled, two-way complaint recordation system may include an autocomplete field for complaint categories and complaint subcategories. The autocomplete field for complaint categories and complaints subcategories may enable a customer, customer service agent, and/or artificially intelligent bot to select, partially enter and/or enter a keyword relating to a complaint category and/or subcategory. For example, if a customer service agent identifies a complaint as an account problem, the customer service agent may enter the word account into the autocomplete field. The autocomplete field may provide the user a suggestion list of complaint categories and subcategories associated with the word account. Because the system utilizes, in some embodiments, a concept mapping, the system may understand and suggest that the terms issue and problem are synonymous with one other.

The autocomplete-enabled, two-way complaint recordation system may include an online process and an offline process. The online process may be a process that is executed in real-time as complaints are being received. The offline process may be a process that is executed prior to, or subsequent to, the customer service agent entering data into the autocomplete field.

The offline process may include executing a concept mapping process on a set of document records included within a database. The set of document records may include various text terms. The concept mapping process may include indexing the set of documents (and indexing the text terms within the set of document records) within an open-source enterprise-search platform. The open-source enterprise-search platform may include a variety of features. These features, included in the open-source enterprise-search platform, may include, inter alia, full-text search, hit highlighting, faceted search and real-time indexing.

An exemplary document record may include the terms account problem. The term account may be mapped to an account concept. The term problem may be mapped to an issue concept. The term to concept mapping and indexing may preferably be executed within the open-source enterprise-search platform.

The online process may be executed in real-time as the customer or customer service agent is entering data (such as, for example, typing text) into the autocomplete entry field within the autocomplete-enabled, two-way complaint recordation system. It should be noted that, for the purposes of this application, the customer and/or customer service agent may individually or collectively be referred to as "the user."

The online process may include receiving data, an entry or a partial entry from the user in real-time. As the customer is entering the data, the online process may include executing the concept mapping on the received data. In an example, the terms account and problem may be included within a previously indexed document. The document may have been previously indexed during the offline process. The online process may include mapping the term account to the account concept and mapping the term problem to the issue concept. The online process may include querying (also referred to as requesting), in real-time, the open-source enterprise-search platform for the concept names associated with the terms, respectively.

It should be noted that the query, or request, may include a channel identifier. The channel identifier ensures that the indexed documents and terms relate to a specific category. As such, the autocomplete-enabled, two-way complaint recordation system can be used for multiple subcategories and the system may be able to respond to the request with the appropriate concept names and records. The channel identifier identifies the type of records that are returned.

It should be noted that there are circumstances in which one or more word reference ontologies may be shared between multiple channels. The ontology may be understood, for the purposes of this application, as a dictionary for a specific discipline. As such, the term checking may be the same across multiple channels. However, if there is a term that includes different meanings within multiple channels, the term may be defined differently within a subontology for each of the different channels.

Machine learning and/or artificial intelligence may be used to improve the accuracy of the concept mapping. For example, based on whether or not the user selected and/or used the complaint category identified within the response, the system may learn whether the mapping between the terms within the request and/or the extracted concepts used to create the response match appropriately. The system may be able to modify the offline concept mapping based on the requests and responses occurring within the online process.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 2 shows illustrative code segments in accordance with principles of the disclosure;

FIGS. 3A, 3B and 3C show additional illustrative code segments in accordance with principles of the disclosure;

DETAILED DESCRIPTION OF THE DISCLOSURE

Figure 1:
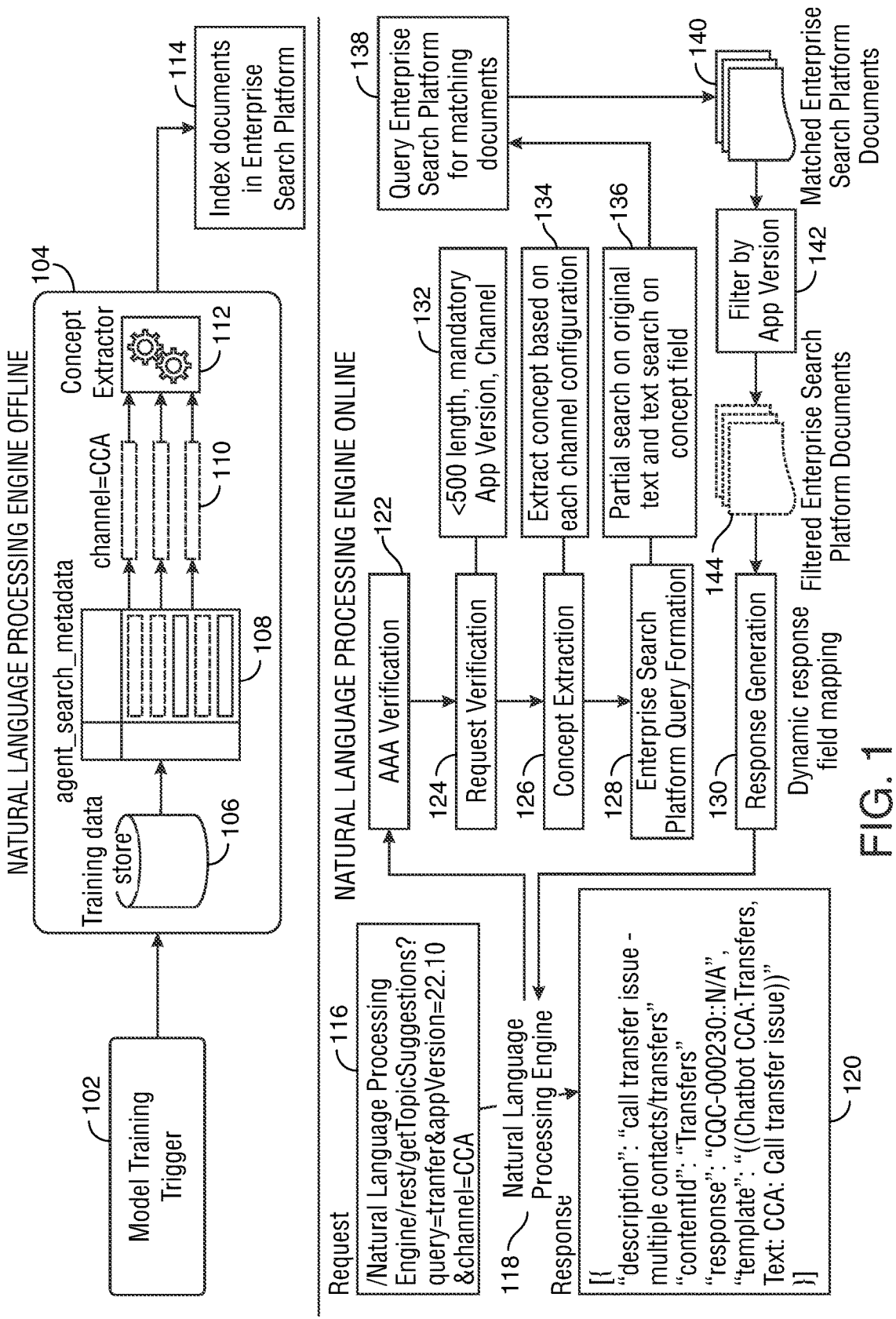
FIG. 1 shows an illustrative diagram in accordance with principles of the disclosure.

Apparatus, methods and systems for concept mapping for chat agent complaint processing is provided.

An autocomplete-enabled, two-way complaint recordation system may include an enterprise-search platform, an offline process and/or an online process.

The offline process may include a database. The database may include a plurality of documents. The offline process may also include a plurality of search metadata. The plurality of search metadata may relate to one or more customer service agents. The offline process may also include a plurality of data relating to one or more channels. The offline process may also include a concept extractor. The concept extractor may be operable to extract a plurality of concepts from a plurality of terms included within the plurality of documents, the search metadata and/or the data relating to one or more channels. The offline process may also include an indexer. The indexer may be operable to index the plurality of documents and the plurality of concepts within the enterprise-search platform.

The online process may include a natural language processing ("NLP") engine. The natural language processing engine may be operable to receive a natural language formatted request. The request may be received from a requestor, such as a customer service agent, a customer or an artificially-intelligent bot. The natural language processing engine may be operable to forward the natural language formatted request to an authorization authenticator. The authorization authenticator may verify that the natural language formatted request is received from an authorized entity. The natural language processing engine may be operable to forward the natural language formatted request from the authorization authenticator to a request verifier.

The request verifier may verify that the length of the natural language formatted request is less than 500 characters. The request verifier may also verify that the application version associated with the natural language formatted request is a correct, or up-to-date, version. The request verifier may also verify that a channel and/or channel data associated with the natural language formatted request is a correct, or up-to-date, channel. It should be noted that an up-to-date application version and/or channel may include non-deprecated and/or non-obsolete application versions and/or channels.

Deprecated application versions and/or channels may refer to application versions and/or channels in which application and/or channel functionality still exists, however, use of the version and/or channel is not recommended. At times, the deprecated version and/or channel may be scheduled to be removed in the future. Deprecated application versions and/or channels may be updated with newer application versions and/or channels.

Obsolete application versions and/or channels may refer to application versions and/or channels in which application and/or channel functionality is no longer supported, no longer available and/or no longer in use. In contrast to deprecated features, obsolete application versions and/or channels may be deemed unusable or irrelevant.

The natural language processing engine may be operable to forward the natural language formatted request from the request verifier to a concept extractor that extracts one or more concepts from the request. The one or more extracted concepts may be based on a configuration of a channel identified within the natural language formatted request.

The natural language processing engine may be operable to forward the natural language request from the concept extractor to a query formulator. The query formulator may formulate a query that corresponds to the extracted one or more concepts. The query formulator may formulate a query that incorporates a partial search on an original text and text search entered into an entry field during the online process.

The natural language processing engine may be operable to forward the query to the enterprise-search platform. The natural language processing engine may be operable to receive, from the enterprise-search platform, one or more documents that match the one or more concepts. The one or more documents may be enterprise-search platform documents. The natural language processing engine may be operable to filter the one or more documents. The natural language processing engine may be operable to generate a response to the request based on the retrieved one or more documents. The response may include a description, a content identifier, a response, a template and any other suitable response data and/or metadata. The natural language processing engine may be operable to provide the response to the requestor.

A complaint processing concept mapping system may be provided. The system may include an offline processor. The offline processor may receive a plurality of historical communications. The plurality of historical communications may be between an agent and an entity. The agent may be an artificially intelligent bot. The agent may be a user. The offline processor may extract one or more concepts from each of the plurality of historical communications. The offline processor may index the one or more extracted concepts, and/or one or more documents associated with the one or more extracted concepts, within an enterprise-search platform. The one or more documents may include one or more complaint categories and/or subcategories.

The system may include an online processor. The online processor may receive a real-time communication from a requestor. The real-time communication may include a request. The online processor may extract one or more real-time concepts from the real-time communication. The online processor may formulate a query.

The query may include data retrieved from the real-time communication. The query may include the one or more extracted real-time concepts. The query may include a normalized search string. The normalized search string may be based on the extracted real-time concepts and the natural language formatted request (which may be input into the entry field).

The online processor may search the enterprise-search platform for the one or more extracted real-time concepts and/or one or more associated documents. The online processor may retrieve one or more extracted real-time concepts and/or one or more associated documents. The online processor may generate a response to the query based on the retrieved real-time concepts and/or or one or more associated documents. The online processor may display the response to the requestor via a user interface.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an autocomplete-enabled complaint system. The system may include a model training trigger, an offline process and an online process.

Model training trigger component 102 may initiate a process to train a model. Model training trigger component 102 may initiate offline process 104.

Offline process 104 may include training data store 106. Agent search metadata, which may include metadata relating to the agent, may be retrieved, as shown at 108. Examples of metadata relating to the agent may be agent role, agent identifier, agent location and any other suitable agent metadata. A channel may be identified, as shown at 110. The indicated channel, shown at 110, may be CCA, which may correspond to a customer complaint channel. Data from training data store 106, agent search metadata 108 and channel information from channel 110 may be input into concept extractor 112. Concept extractor may extract concept data and input the documents into the enterprise-search platform. The documents may be indexed within the enterprise-search platform, as shown at 114.

The online process may include receiving request 116 at natural language processing engine 118. Natural language processing engine 118 may be used for interactive voice and text response systems. Request 116 may be received in real-time. Request 116 may be received, at the system, from a customer or customer service agent. Request 116 may include a query. The query may include the term transfer. Request 116 may be forwarded from natural language processing engine 118 to AAA verification 122 (see definition of AAA below). Request 116 may be verified at AAA verification 122. Request 116 may be received at a uniform resource locator ("URL").

AAA verification 122 may be an authorization authentication process that verifies that the query is received from an authorized entity. In the event that an unauthorized entity acquires the URL used to access the online system, the query may only be processed if the requestor has the appropriate authorization, such as an authentication token.

Upon authorization authentication, the request may be verified at request verification 124. Verification of the request may ensure that the request includes the components used to generate a request, as shown at 132. The components of the request may include a length of less than 500 characters, an appropriate application version and an appropriate channel.

Upon verification, the request may be transferred to concept extraction 126. Concept extraction 126 may be used to extract concepts from the query. It should be noted that a real-time concept extraction, such as concept extraction 126, may utilize the same functionality as the offline concept extractor, shown at 112. Concept extraction 126 may extract one or more concepts based on each channel's configuration, as shown at 134.

Upon concept extraction, a query may be formulated, as shown at Query formation 128. Partial searches may be enabled. Partial searching capabilities may be based on the original text and text search in the concept field, as shown at 136.

The query may be directed to an enterprise-search platform. The enterprise-search platform may retrieve documents that match the query, as shown at 138. The matched documents, shown at 140, may be filtered by application version, as shown at 142. The filtered documents, shown at 144, may be provided to response generation 130. Response generation 130 may generate dynamic responses to requests. Response generation 130 may utilize field mapping to generate the responses. Response generation 130 may provide the response to natural language processing engine 118. Natural language processing engine 118 may provide a response, such as response 120, to the requestor. The format of the response may be shown at 120. The format of the response may include a description, a content identifier, a response and a template. It should be reiterated that CCA corresponds to a customer complaint channel.

FIG. 2 shows illustrative code segments. Segment 202 shows an illustrative uniform resource locator and an illustrative document record that is indexed within the enterprise-search platform. The uniform resource locator ("URL") shown within 202 may include the concept transfer, as shown at 204. As such, the response may include transfer related responses.

Segment 206 shows an illustrative response. The illustrative responses may include a description, a content identifier, a response and a template.

FIGS. 3A, 3B and 3C show illustrative code segments. Each of FIGS. 3A, 3B and 3C show illustrative responses provided by the enterprise-search platform.

Figure 4:
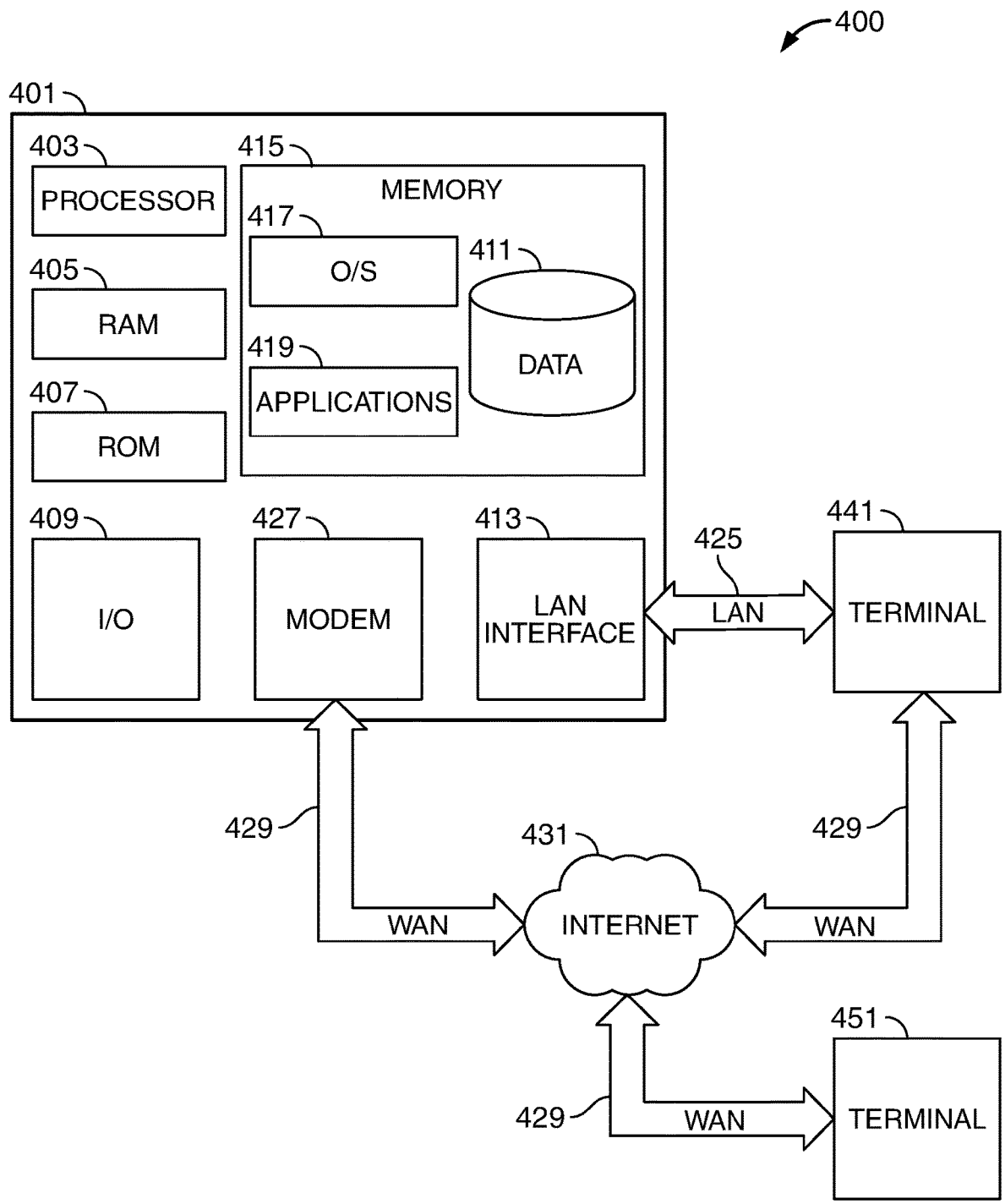
FIG. 4 shows an illustrative diagram in accordance with principles of the disclosure.

FIG. 4 shows an illustrative block diagram of apparatus 400 that includes a computer 401. Computer 101 may alternatively be referred to herein as a "computing device." Elements of apparatus 400, including computer 401, may be used to implement various aspects of the apparatus and methods disclosed herein. A "user" of apparatus 400 or computer 401 may include other computer systems or servers or computing devices, such as the program described herein.

Computer 401 may have one or more processors/microprocessors 403 for controlling the operation of the device and its associated components, and may include RAM 405, ROM 407, input/output module 409, and a memory 415. The microprocessors 403 may also execute all software running on the computer 401—e.g., the operating system 417 and applications 419 such as an artificial intelligence implemented termination program and security protocols. Other components commonly used for computers, such as EEPROM or Flash memory or any other suitable components, may also be part of the computer 401.

The memory 415 may be comprised of any suitable permanent storage technology—e.g., a hard drive or other non-transitory memory. The ROM 407 and RAM 405 may be included as all or part of memory 415. The memory 415 may store software including the operating system 417 and application(s) 419 (such as an artificial intelligence implemented termination program and security protocols) along with any other data 411 (e.g., historical data, configuration files) needed for the operation of the apparatus 400. Memory 415 may also store applications and data. Alternatively, some or all of computer executable instructions (alternatively referred to as "code") may be embodied in hardware or firmware (not shown). The microprocessor 403 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as an artificial intelligence implemented termination program and security protocols) along with any data needed for the operation of the apparatus and to allow bot monitoring and IoT device notification. The data may also be stored in cache memory, or any other suitable memory.

An input/output ("I/O") module 409 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 401, the microprocessor 403 may execute the instructions in all or some of the operating system 417, any applications 419 in the memory 415, any other code necessary to perform the functions in this disclosure, and any other code embodied in hardware or firmware (not shown).

In an embodiment, apparatus 400 may consist of multiple computers 401, along with other devices. A computer 401 may be a mobile computing device such as a smartphone or tablet.

Apparatus 400 may be connected to other systems, computers, servers, devices, and/or the Internet 431 via a local area network (LAN) interface 413.

Apparatus 400 may operate in a networked environment supporting connections to one or more remote computers and servers, such as terminals 441 and 451, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 441 and 451 may be personal computers, smart mobile devices, smartphones, IoT devices, or servers that include many or all of the elements described above relative to apparatus 400. The network connections depicted in FIG. 4 include a local area network (LAN) 425 and a wide area network (WAN) 429 but may also include other networks. Computer 401 may include a network interface controller (not shown), which may include a modem 427 and LAN interface or adapter 413, as well as other components and adapters (not shown). When used in a LAN networking environment, computer 401 is connected to LAN 425 through a LAN interface or adapter 413. When used in a WAN networking environment, computer 401 may include a modem 427 or other means for establishing communications over WAN 429, such as Internet 431. The modem 427 and/or LAN interface 413 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 419 (which may be alternatively referred to herein as "plugins," "applications," or "apps") may include computer executable instructions for an artificial intelligence implemented termination program and security protocols, as well as other programs. In an embodiment, one or more programs, or aspects of a program, may use one or more AI/ML algorithm(s). The various tasks may be related to terminating or preventing a malicious AI from completing its malicious activities.

Computer 401 may also include various other components, such as a battery (not shown), speaker (not shown), a network interface controller (not shown), and/or antennas (not shown).

Terminal 451 and/or terminal 441 may be portable devices such as a laptop, cell phone, tablet, smartphone, server, or any other suitable device for receiving, storing, transmitting and/or displaying relevant information. Terminal 451 and/or terminal 441 may be other devices such as remote computers or servers. The terminals 451 and/or 441 may be computers where a user is interacting with an application.

Any information described above in connection with data 411, and any other suitable information, may be stored in memory 415. One or more of applications 419 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 5:
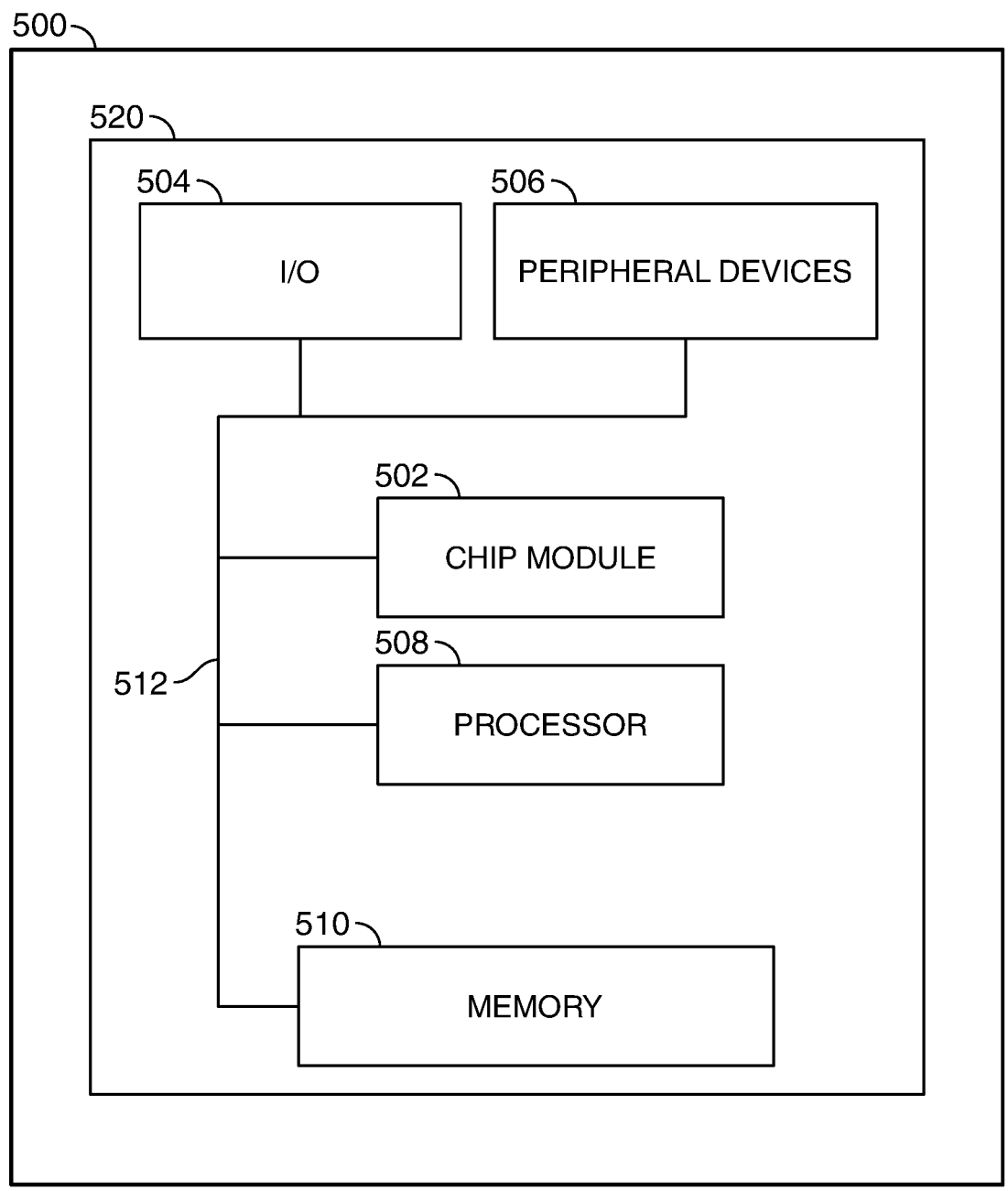
FIG. 5 shows another illustrative diagram in accordance with principles of the disclosure.

FIG. 5 shows illustrative apparatus 500 that may be configured in accordance with the principles of the disclosure. Apparatus 500 may be a server or computer with various peripheral devices 506. Apparatus 500 may include one or more features of the apparatus shown in FIGS. 1-5. Apparatus 500 may include chip module 502, which may include one or more integrated circuits, and which may include logic configured to perform any other suitable logical operations.

Apparatus 500 may include one or more of the following components: I/O circuitry 504, which may include a transmitter device and a receiver device and may interface with fiber optic cable, coaxial cable, telephone lines, wireless devices, PHY layer hardware, a keypad/display control device, a display (LCD, LED, OLED, etc.), a touchscreen or any other suitable media or devices, peripheral devices 506, which may include other computers, logical processing device 508, which may compute data information and structural parameters of various applications, and machine-readable memory 510.

Machine-readable memory 510 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 502, 504, 506, 508 and 510 may be coupled together by a system bus or other interconnections 512 and may be present on one or more circuit boards such as 520. In some embodiments, the components may be integrated into a single chip. The chip may be silicon-based.

Thus, systems and methods for concept mapping for chat agent complaint processing are provided. Persons skilled in the art will appreciate that the present invention can be practiced by other than the described embodiments, which are presented for purposes of illustration rather than of limitation. The present invention is limited only by the claims that follow.

What is claimed is:

1. An autocomplete-enabled, two-way complaint recordation system comprising:
an enterprise-search platform;
an offline process comprising:
a database comprising a plurality of documents;
a plurality of search metadata relating to one or more agents;
a plurality of data relating to one or more channels; and
a concept extractor operable to extract a plurality of concepts from a plurality of terms included within the plurality of documents, search metadata and data relating to one or more channels;
an indexer operable to index the plurality of documents and the plurality of concepts within the enterprise-search platform;
an online process comprising:
a natural language processing engine operable to:
receive a natural language formatted request from a requestor;
forward the natural language formatted request to an authorization authenticator;
forward the natural language formatted request from the authorization authenticator to a request verifier;
forward the natural language formatted request from the request verifier to a concept extractor that extracts one or more concepts from the request;
forward the natural language formatted request from the concept extractor to a query formulator that formulates a query that corresponds to the extracted one or more concepts;
forward the query to the enterprise-search platform;
receive from the enterprise-search platform, one or more documents that match the one or more concepts;
filter the one or more documents;
generate a response to the request based on the one or more documents; and
provide the response to the requestor.

2. The system of claim 1 wherein the authorization authenticator verifies that the natural language formatted request is received from an authorized entity.

3. The system of claim 1 wherein the request verifier verifies that a length of the natural language formatted request is less than 500 characters.

4. The system of claim 1 wherein the request verifier verifies that:
an application version associated with the natural language formatted request is a correct version; and
a channel associated with the natural language formatted request is a correct channel.

5. The system of claim 1 wherein the concept extractor extracts the one or more concepts based on a configuration of a channel identified within the natural language formatted request.

6. The system of claim 1 wherein the query formulator formulates a query that incorporates a partial search on an original text and text search entered into an entry field.

7. The system of claim 1 wherein the response includes a description, a content identifier, a response and a template.

8. A method for recording complaints within an autocomplete-enabled, two-way complaint recordation system, the method comprising:
receiving a plurality of documents during an offline process;
receiving a plurality of agent metadata during the offline process;

receiving a plurality of channel data during the offline process;

extracting, during the offline process, a plurality of concepts from the documents, agent metadata and channel data;

mapping and indexing, within an enterprise-search platform, during the offline process, each term included in a plurality of terms identified within the plurality of documents to a concept, included in a plurality of concepts;

receiving, during an online process, a natural language formatted request from a requestor at a natural language processing engine;

forwarding, during the online process, the natural language formatted request from the natural language processing engine to an authorization authenticator;

forwarding, during the online process, the natural language formatted request from the authorization authenticator to a request verifier;

forwarding, during the online process, the natural language formatted request from the request verifier to a concept extractor that extracts one or more concepts from the request;

forwarding, during the online process, the natural language formatted request from the concept extractor to a query formulator that formulates a query that corresponds to the extracted one or more concepts;

forwarding, during the online process, the query to the enterprise-search platform;

querying, during the online process, the enterprise-search platform for documents that match the one or more concepts;

receiving, during the online process, from the enterprise-search platform, one or more documents that match the one or more concepts;

filtering, during the online process, the one or more documents;

generating, during the online process, a response to the request based on the received one or more documents; and providing, during the online process, the response to the natural language processing engine; and providing, during the online process, the response to the requestor via the natural language processing engine.

9. The method of claim 8 wherein the authorization authenticator verifies that the natural language formatted request is received from an authorized entity.

10. The method of claim 8 wherein the request verifier verifies that:
   a length of the natural language formatted request is less than 500 characters;
   an application version associated with the natural language formatted request is a correct version; and
   a channel associated with the natural language formatted request is a correct channel.

11. The method of claim 8 wherein the concept extractor extracts the one or more concepts based on a configuration of a channel identified within the natural language formatted request.

12. The method of claim 8 wherein the query, formulated by the query formulator, incorporates a partial search on an original text and text search entered into an entry field.

13. The method of claim 8 wherein the response includes a description, a content identifier, a response and a template.

14. A complaint processing concept mapping system, the system comprising:
   an offline processor, the offline processor operable to:
      receive a plurality of historical communications, said plurality of historical communications between an agent and an entity;
      extract one or more concepts from each of the plurality of historical communications; and
      index the one or more extracted concepts, and one or more documents associated with the one or more extracted concepts, within an enterprise-search platform;
   an online processor, the online processor operable to:
      receive a real-time communication from a requestor;
      extract one or more real-time concepts from the real-time communication;
      formulate a query, said query comprising:
         data retrieved from the real-time communication; and
         the one or more extracted real-time concepts;
      search the enterprise-search platform for the one or more extracted real-time concepts and/or one or more documents associated with the one or more extracted real-time concepts; and
      retrieve the one or more extracted real-time concepts and/or one or more documents associated with the one or more extracted real-time concepts;
      generate a response to the query based on the retrieved one or more extracted real-time concepts and/or or one or more documents associated with the one or more extracted real-time concepts; and
      display the response to the requestor via a user interface.

15. The system of claim 14 wherein the agent is an artificially intelligent bot.

16. The system of claim 14 wherein the real-time communication comprises a request.

17. The system of claim 14 wherein the agent is a user.

18. The system of claim 14 wherein the one or more documents associated with the one or more extracted concepts comprise one or more complaint categories and/or subcategories.

19. The system of claim 14 wherein the query is a normalized search string.

20. The system of claim 14 wherein the one or more documents associated with the one or more extracted real-time concepts comprise one or more complaint categories and/or subcategories.

* * * * *